US006109628A

United States Patent [19]

Scheper

[11] Patent Number: 6,109,628
[45] Date of Patent: Aug. 29, 2000

[54] CART FOR CARRYING STOCK FOR LIGHT MAINTENANCE

[76] Inventor: William A. Scheper, 132 Claremont Ave., South San Fransisco, Calif. 94080

[21] Appl. No.: 09/399,939

[22] Filed: Sep. 21, 1999

[51] Int. Cl.[7] .................... B62B 11/00
[52] U.S. Cl. .................... 280/47.35; 182/129
[58] Field of Search .................... 280/47.34, 47.35; 182/129; 206/372, 373, 419; 211/128.1

[56] References Cited

U.S. PATENT DOCUMENTS

| | | | |
|---|---|---|---|
| D. 335,735 | 5/1993 | Isom | D34/12 |
| D. 335,736 | 5/1993 | Isom | D34/25 |
| 1,979,514 | 11/1934 | Wilson | 211/128.1 |
| 2,775,499 | 12/1956 | Gleitsman | 182/129 |
| 3,210,091 | 10/1965 | Ng | 280/47.35 |
| 3,397,757 | 8/1968 | Greer | 182/129 |
| 3,497,234 | 2/1970 | Schray | 280/47.35 |
| 3,857,460 | 12/1974 | Nini . | |
| 3,897,080 | 7/1975 | Isom | 280/47.9 |
| 4,350,366 | 9/1982 | Helms | 280/47.35 X |
| 4,652,003 | 3/1987 | Karashima | 280/166 |
| 5,542,535 | 8/1996 | Dalton | 206/419 |

*Primary Examiner*—Brian L. Johnson
*Assistant Examiner*—Bryan Fischmann
*Attorney, Agent, or Firm*—Robert Samuel Smith

[57] ABSTRACT

A workman's service cart for storing and transporting a ladder, tools, a carton of fluorescent light cylinders and tools related to maintenance of a fluorescent light fixtures including a base platform with wheels on a bottom side and a superstructure on the top side including a slant panel for extending from the base panel for supporting the ladder and connected to an edge of top panel. The top panel has an aperture for inserting the carton of fluorescent light cylinders on one side of a vertical partition panel. An array of shelves is located on the other side of the partition panel. The cart is built to permit a workman to stand on the top panel and exchange fluorescent light cylinders successively without having to climb down the ladder for each cylinder.

14 Claims, 4 Drawing Sheets

CART FOR CARRYING STOCK FOR LIGHT MAINTENANCE

FIELD OF THE INVENTION

This invention relates to carts carrying workmen's tools, stock, etc., and particularly to a cart adapted to carrying the supplies for maintaining the fluorescent lights and hardware for a large facility.

PRIOR ART AND INFORMATION DISCLOSURE

Maintaining the lighting system of fluorescent lighting in a large facility is a full time job requiring the transport throughout the building of the elongated light cylinders (bulbs), a means (ladder) to provide access to the light receptacles, spare parts such as transformers, and tools such as a screw driver, wire strippers, pliers, flash light etc. for unexpected repairs.

Workmen's carts that are intended for transporting various job related items around the work site have appeared in the literature.

U.S. Pat. No. 3,897,080 to Isom which discloses a cart with a handle and on wheels and comprising vertically extending storage compartment for receiving a compartment of elongated bulbs. Steps are formed on the cart for elevating an individual and storage compartments are formed under the steps. The Isom disclosure has no provision for carrying a ladder.

U.S. Pat. No. D 335,735 to Isom discloses a design almost identical to the earlier patent to Isom with the addition of two front legs which, together with two wheels, support the cart.

U.S. Pat. No. D 335,736 to Isom discloses a design that is identical to Isom U.S. Pat. No. D 335,735 but shows a ladder (in phantom) supported on a front lower step with the addition of two front legs which, together with two wheels, support the cart.

U.S. Pat. No. D 4,652,003 to Karashima discloses a service cart including a cart having a frame with wheels on a supporting bottom and a top plate and a stepladder pivotally connected to the cart that swings against the cart for transport purposes and swings away from the cart for support on the floor when positioned for use of the step ladder.

SUMMARY OF THE INVENTION

It is an object of this invention to provide a service cart for maintaining a fluorescent lighting system that is more convenient and advantageous in use than carts of the cited art.

This invention is directed toward a cart having a rhomboidal base platform that supports a super structure having a slanted panel under a top platform and a shelving arrangement that permits carrying a container of fluorescent cylinders in one section of the cart and shelves for carrying tools and spare parts in another section.

The slanted panel in combination with the broadest end of the rhomboidal base platform is configured to support either a standard four foot or six foot ladder. The ladder is positioned against the slanted side of the superstructure by a clip and is retained at the top end of the slanted platform between a pair of arms extending from a top panel. The top panel is joined to the top end of the slanted panel. The ladder is further supported on on an end region of the base platform. This stable construction permits a workman to climb up the ladder while the ladder is mounted on the cart or use the ladder to gain access to or stand on the top platform when required for access to remote regions of the worksite.

A container of fluorescent light fixtures is conveniently stored on the cart such as to permit direct access to more than one light cylinders while the workman is standing on the top panel. This feature is especially convenient when a plurality of light cylinders must be installed in a single light receptacle as is typically with most fluorescent fixtures.

The suspension of the wheels to the cart includes non swivally mounted large wheels on the underside of the base platform supporting the ladder and swivally mounted smaller wheels under the edge of the base platform remote from the ladder so that the cart is very maneuverable when pushed in one direction around office furniture by virtue of the swivally mounted small wheels and yet can be pulled over large threshholds, elevators badly out of adjustment, cord s and debris without locking the tires.

The narrowed front end of the rhomboidal base provides more convenient navigation of tight spaces, essential in an office environment.

DESCRIPTION OF A BEST MODE OF THE INVENTION

Figure 1:
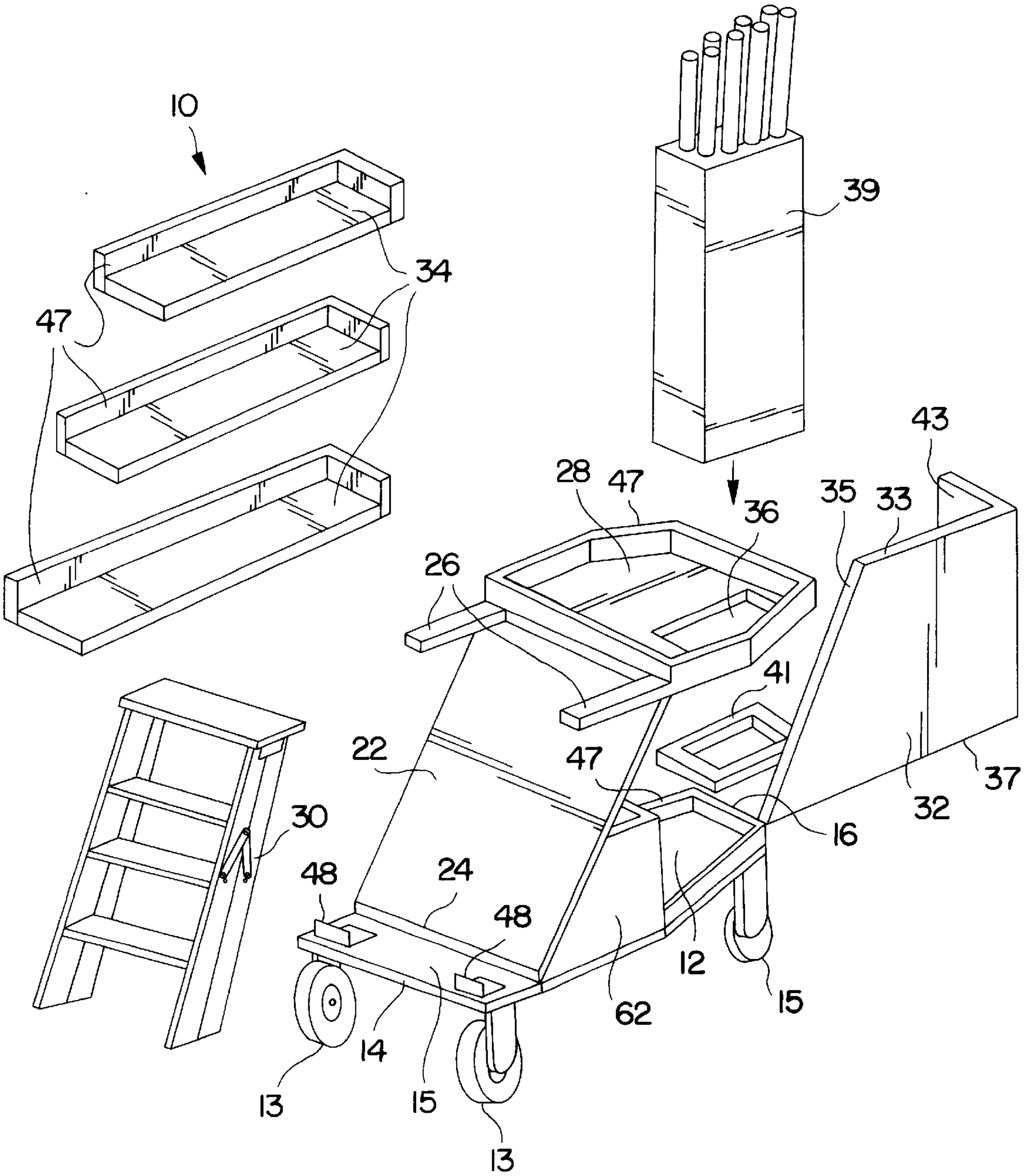
FIG. 1 shows an exploded view of the the cart of this invention.
Figure 2:
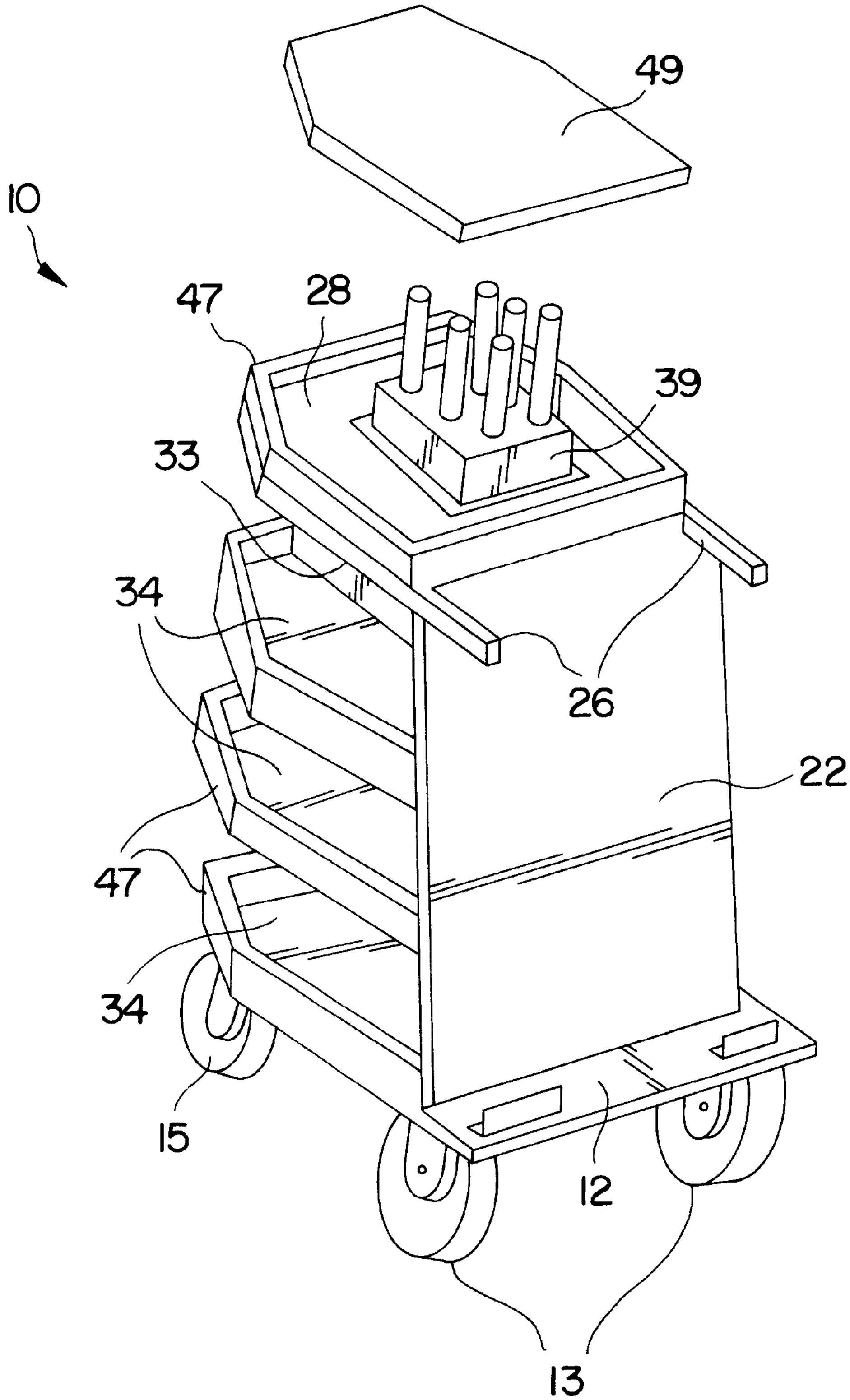
FIG. 2 is an assembled view of one side showing the array of shelves of the cart of FIG. 1.
Figure 3:
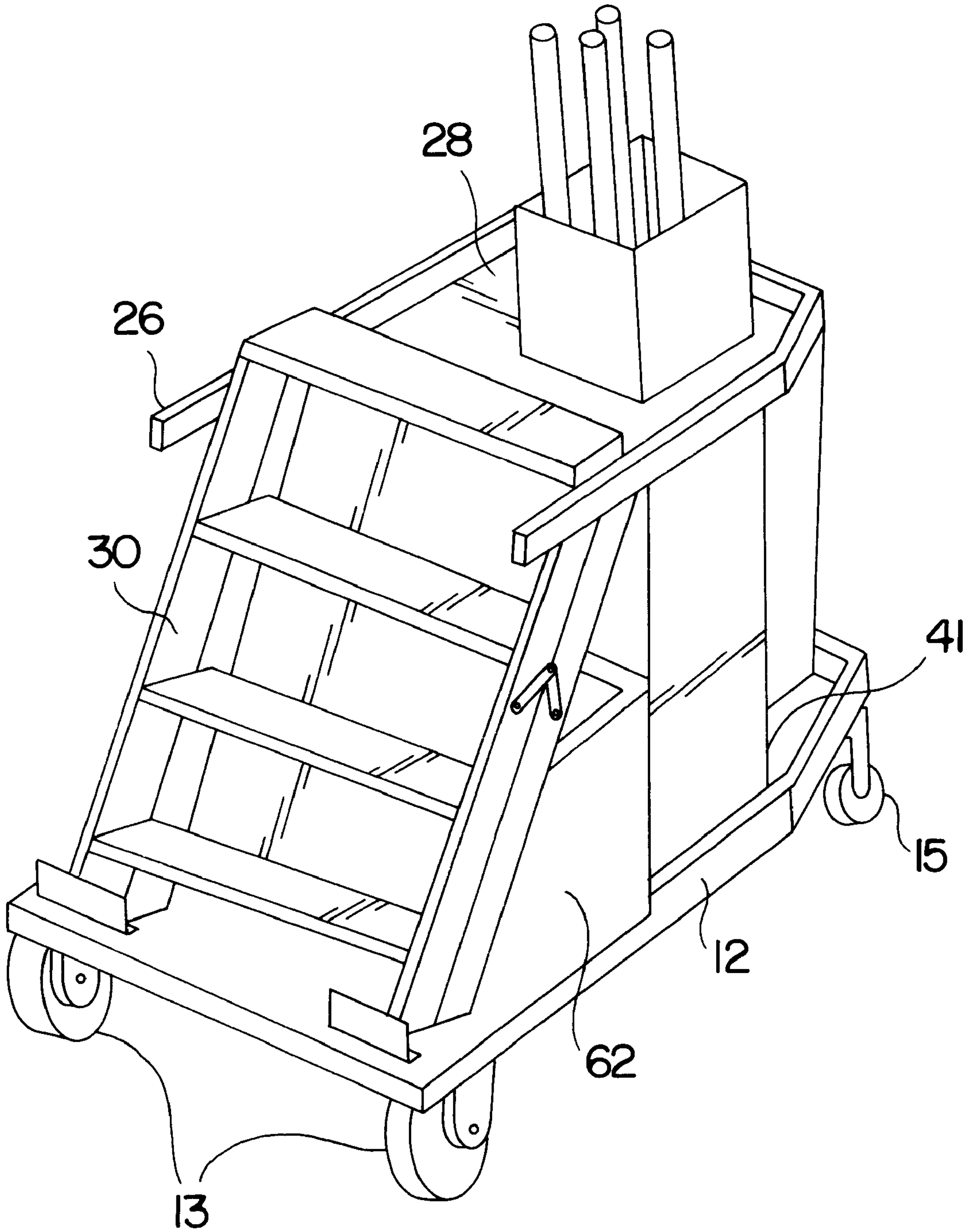
FIG. 3 is an assembled view showing an opposite side and a carton of light cylinders stowed on the cart.

Turning now to a description of the drawings, FIG. 1 is a perspective exploded view showing components of the cart 10 of the invention and FIGS. 2 and 3 are perspective views of the assembled cart 10.

A base panel 12 is shown having a generally rhomboidal shape with a long edge 14 parallel to a short edge 16. A pair of "large" wheels 13 is shown with fixed axles mounted under the long edge 14 and a pair of "small" wheels 15 is shown swivally mounted under the short edge 16. A slanted panel 22 has a lower end 24 supported on the base panel parallel to the long edge 14 and extends obliquely away from the base panel 12. An area 11 of the base panel between the long edge of the base platform and the lower end 24 of the slanted panel 22 supports the ends of legs of a step ladder 30 supported against the slanted panel. The ladder 30 is further stabilized by confinement between a pair of alms 26 that extend from a top panel 28 mounted on the top end of the slanted panel 22.

A partition panel 32 is centrally located in the cart 10 and has a first edge 33 perpendicularly joined to the top panel 28, a second edge 35 perpendicularly joined to the slanted panel 22, and a third edge 37 perpendicularly joined to the base panel 12. FIG. 2 shows an array of shelves 34 for holding spare transformers and other parts and tools on one side of the partition panel 32. A rear panel 43 is shown attached to an edge of slant panel 32 and an end of the shelves 34 for reinforcing support of the shelves. FIG. 3 shows the opposite side of the partition panel 22 which is open (no shelves) and permits storing a carton 39 of fluorescent light cylinders with one end of the light cylinders resting on the base panel and an opposite end of the carton extending through an aperture 36 in the top panel 28. An enclosure 41 is secured on the base panel for stabilizing the bottom end ofe the carton 39. A second enclosure 62 is shown for storing short light tubes.

The construction has numerous conveniences advantages over work carts of the prior art.

One advantage is the ease with which a heavy carton of light cylinders can be loaded onto the cart by first sliding the upper end of the carton through the aperture 36 of top panel 28 and then placing the lower end on base panel 12. This procedure avoids the necessity of lifting the entire carton over the top of the cart and then lowering the carton into the receptacle area as practiced for example, by the Isom disclosure.

Another advantage is that the ladder can be used separate from the cart as required or stably mounted on the cart, confined between the extending alms 26, against the slanted panel 22, and on the base panel 12 permitting the workman to climb up to and stand on the top panel which is a much more convenient posture than the alternative of balancing on a step ladder while trying to reach overhead to insert a light cylinder. The workman is also spared the requirement to climb up and down the ladder several times to service a receptacle requiring multiple light cylinders.

The cart can be either pushed with the large wheels in the forward direction for overcoming obstacles such as cords, uneven elevators, etc. that would block small wheels or pushed with the small swivally mounted wheels in the forward direction so that the cart may be conveniently steered around office furniture.

A partition panel construction providing shelves for parts and tools on one side of the panel and light cylinders on the opposite side is also a major convenience particularly in being a convenient storage rack for these items when the cart is not in use. The partition panel adds considerable strength for supporting the weight of the workman standing on the top panel.

Variations and modification of this invention may be contemplated after reading the specification and studying the drawings which are within the scope of the invention.

For example, the figs. show a pair of angle brackets 48 positioned on the base panel 12 to engage the feet of ladder resting against the slant panel to further stabilize the ladder mounted on the cart.

The wheels 13 of the cart have preferably inflatable rubber or neoprene tires but may be other designs such as a solid elastomeric composition such as urethane.

Figure 4:
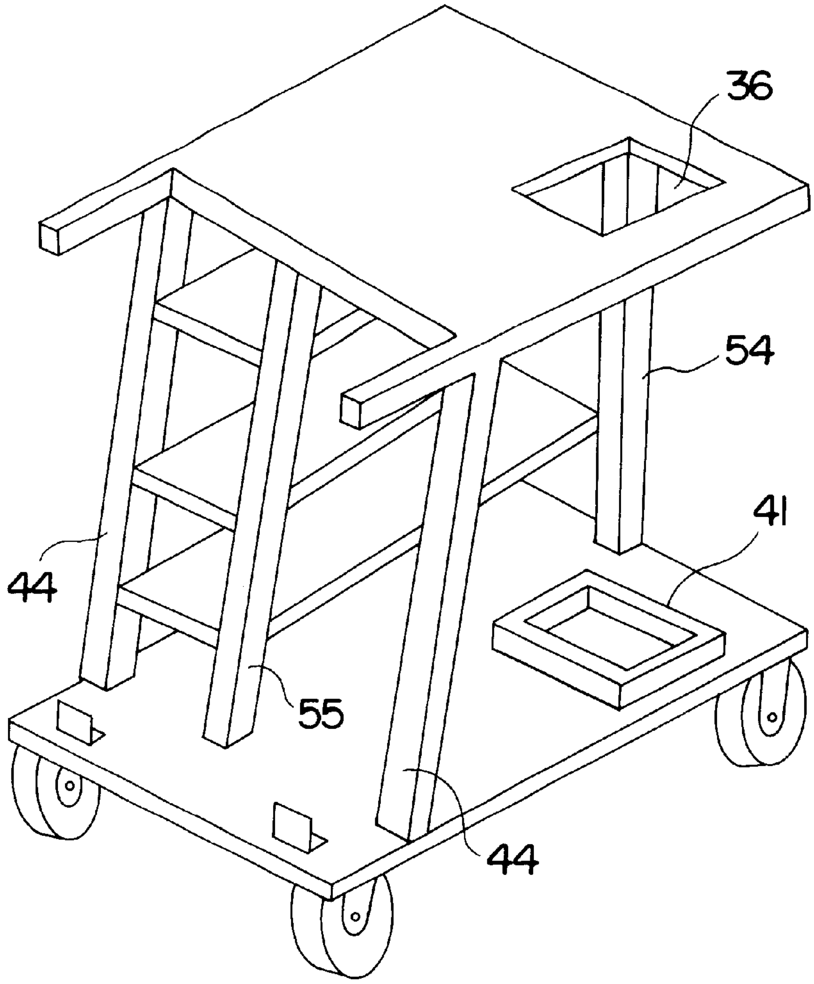
FIG. 4 is an assembled view showing a ladder mounted on the cart.

FIG. 4 shows a cart of this invention with the slant panel replaced by a slanted pair of elongated members 44 and a vertical elongated members 54 and 55 replacing the partition panel 32.

The elongated members are preferably wooden posts having a square cross section or hollow square steel tubes.

FIGS. 1, 2 and 3 show walls 47 around the perimeters of the shelves 12, 28, 34.

FIG. 2 shows a platform 49 that can be positioned on top of top shelf 28 to cover aperture 36 when the box 39 of tubes is removed so as to provide a safer platform on which a workman can stand when required.

Figure 5:
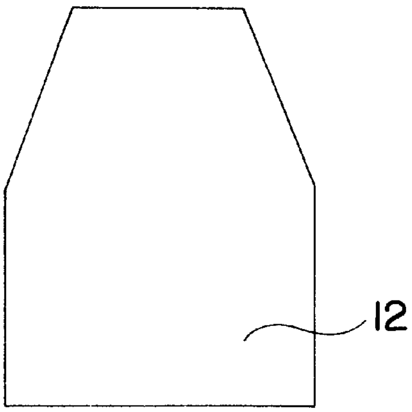
FIG. 5 is a top view of panel 12.

As shown in FIGS. 1–3 and further illustrated in FIG. 5 which is a top view of panel 12, in one embodiment, the cart is narrowed at the forward end to facilitate maneuvering the cart into cramped spaces.

In view of such variations, I therefore wish to define the scope of my invention by the appended claims.

I claim:

1. A workman's cart, for carrying a carton of fluorescent light cylinders, a ladder having a pair of feet and tools to service fluorescent light fixtures, which comprises:

a base panel (12) having four edges and four corners;

two pairs of wheels (13, 15) mounted on an underside of said base platform, each corner proximal to one wheel of said two pairs of wheels a slanted panel (22) having a lower edge secured to said base panel parallel to and spaced from one edge of said four edges;

said slanted panel slanted relative to said base panel to enable that the ladder be rested against said slant panel with bottom feet of said ladder supported on an area of said base panel between said one edge of said base panel and said lower edge of said slanted panel;

a top panel (28) oriented parallel to said base panel and having one edge joined to an upper edge of said slanted panel, said upper edge being opposite said lower edge of said slanted panel;

said top panel having an aperture dimensioned to permit supporting a lower end of the carton of light cylinders on said base panel and an upper end of said carton of light cylinders protruding through said aperture;

a partition panel (32) having a first edge perpendicularly joined to said base panel, a second edge joined perpendicularly to said slanted panel, a third edge perpendicularly joined to said top panel;

a vertical array of shelves;

said partition panel (32) positioned in operable combination with said aperture and said array of shelves to permit storing said carton on one side of said partition panel (32) with an upper end of said carton protruding through said aperture and a lower end of said carton supported on said base panel (12) and said vertical array of shelves positioned on said base panel on another side of said partition panel;

said base panel, partition panel, slant panel and top panel all operably arranged in combination with one another to deposit leaning the ladder against the slant panel with feet of said ladder supported on said area and enable a workman to climb the ladder and stand on said top platform, withdraw a fluorescent light cylinder from said carton to service the fluorescent light fixtures;

each pair of said two pairs of wheels has one wheel mounted to an underside of said base panel on one side of said partition panel and another wheel mounted to said base panel on another side of said base panel; and each wheel of one pair of said two pairs of wheels closest to said lower edge of said slanted panel is mounted on a fixed axle attached to said bottom side of said base panel;

each wheel of another pair of said two pairs of wheels remote from said lower edge of said slanted panel is swivally mounted on said bottom side of said base panel;

each wheel of another pair of said two pairs of wheels remote from said lower edge of said slanted panel is smaller than each wheel of another larger pair of said two pairs of wheels closest to said lower edge of said slanted panel providing that, when said cart is pushed with said cart oriented where larger wheels are oriented in a forward direction, rolling over obstacles is facilitated and when said cart is pushed with said cart oriented with said smaller wheels in said forward direction.

2. The cart of claim 1 wherein:

each pair of said two pairs of wheels has one wheel mounted to an underside of said base panel on one side of said partition panel and another wheel mounted to said base panel on another side of said base panel; and each wheel of one pair said two pairs of wheels closest to said lower edge of said slanted panel is mounted on a fixed axle attached to said bottom side of said base panel;

each wheel of another pair of said two pairs of wheels remote from said lower edge of said slanted panel is swivally mounted on said bottom side of said base panel.

3. The cart of claim 1 wherein each wheel of said one pair of wheels has a diameter of about ten inches and each wheel of said another pair of wheels has a diameter of about eight inches.

4. The cart of claim 1 wherein each wheel of said one pair of wheels is closer to another wheel of said one pair of wheels than each wheel of said another pair of wheels is to another wheel of said another pair of wheels providing that maneuverability of said cart is facilitated.

5. The cart of claim 1 wherein said wheels have inflatable elastomeric tires.

6. The cart of claim 1 wherein said wheels have elastomeric tires.

7. A workman's cart, for carrying a carton of fluorescent light cylinders, a ladder having a pair of feet and tools to service fluorescent light fixtures, which comprises:

a base panel (12) having four edges and four corners;

two pairs of wheels (13, 15) mounted on an underside of said base platform, each corner proximal to one wheel of said two pairs of wheels a slanted panel (22) having a lower edge secured to said base panel parallel to and spaced from one edge of said four edges;

said slanted panel slanted relative to said base panel to enable that the ladder be rested against said slant panel with bottom feet of said ladder supported on an area of said base panel between said one edge of said base panel and said lower edge of said slant panel;

a top panel (28) oriented parallel to said base panel and having one edge joined to an upper edge of said slanted panel, said upper edge being opposite said lower edge of said slanted panel;

said top panel having an aperture dimensioned to permit supporting a lower end of the carton of light cylinders on said base panel and an upper end of said carton of light cylinders protruding through said aperture;

a partition panel (32) having a first edge perpendicularly joined to said base panel, a second edge joined perpendicularly to said slanted panel, a third edge perpendicularly joined to said top panel;

a vertical array of shelves;

said partition panel (32) positioned in operable combination with said aperture and said array of shelves to permit storing said carton on one side of said partition panel (32) with an upper end of said carton protruding through said aperture and a lower end of said carton supported on said base panel (12) and said vertical array of shelves positioned on said base panel on another side of said partition panel;

said base panel, partition panel, slant panel and top panel all operably arranged in combination with one another to permit leaning the ladder against the slant panel with feet of said ladder supported on said area and enable a workman to climb the ladder and stand on said top platform, withdraw a fluorescent light cylinder from said carton to service the fluorescent light fixtures;

a pair of angle brackets (48) operably secured to said base panel in the area between the lower edge of the slant panel (22) and said one edge of said base panel to permit one foot of said ladder resting against said slant panel to engage one said angle bracket of said pair of angle brackets and another foot of said ladder to engage another said angle bracket of said pair of angle brackets.

8. A workman's cart, for carrying a carton of fluorescent light cylinders, a ladder having a pair of feet and tools to service fluorescent light fixtures, which comprises:

a base panel (12) having four edges and four corners;

two pairs of wheels (13, 15) mounted on an underside of base platform, each corner proximal to one wheel of said two pairs of wheels a slanted member having one end secured to said base panel parallel to and spaced from one edge of said four edges;

said slanted member defining a slanted surface, slanted relative to said base panel to enable that the ladder be rested against said slanted member with bottom feet of said ladder supported on an area of said base panel between said one edge of said base panel and said lower end of said slant member;

a top panel defining a top surface oriented parallel to said base panel and having one end of said top panel joined to an upper end of said slanted member, said upper end being opposite said lower end of said slanted member;

said top panel having surface with an aperture dimensioned to permit supporting a lower end of the carton of light cylinders on said base panel and an upper end of said carton of light cylinders protruding through said aperture;

a partition member defining a first boundary perpendicularly meeting said base panel, a second boundary perpendicularly meeting said slanted surface, a third boundary perpendicularly joined to said top member;

said partition member is a pair of elongated members, each having an upper end joined to said top panel and a lower end supported on said base panel;

a vertical array of shelves;

said partition member positioned in operable combination with said aperture and said array of shelves to permit storing said carton on one side of said partition member with an upper end of said carton protruding through said aperture and a lower end of said carton supported on said base panel (12) and said vertical array of shelves positioned on said base panel on another side of said partition member;

said base panel, partition member, slant member and top panel all operably arranged in combination with one another to permit leaning the ladder against an edge of said top panel with feet of said ladder supported on said area and enable a workman to climb the ladder and stand on said top panel, and withdraw fluorescent light cylinders from said carton to service the fluorescent light fixtures.

9. The cart of claim 8 wherein said partition member comprises one of a wooden post and a metal tube.

10. The cart of claim 1 further comprising a pair of arms (26), each extending from an edge of said top panel, parallel to said top panel and spaced from one another to permit an upper end of the ladder resting on said slant platform to be position between said arms of said pair of arms.

11. The cart of claim 1 further comprising a pair of arms 26 that extend from a top panel 28 mounted on the top end of the slanted panel 22 operably arranged in combination with said top panel to stabilize said ladder supported against said slant panel and base panel by confinement of said ladder between said pair of arms.

12. The cart of claim 1 further comprising a wall around a perimeter of each of said base panel (12), top panel 28 and each shelf of said vertical array of shelves.

13. The cart of claim 1 further comprising a platform dimensioned to cover said top panel and close over said aperture.

14. The cart of claim 1 wherein said one edge of said base panel and said top panel have a common length that is greater than a length of a forward edge of said base panel and top panel opposited said one edge of said base panel and top panel.

* * * * *